Jan. 19, 1965   J. CAGGAINELLO   3,166,041
RETRACTABLE SIGNAL DEVICES
Filed June 16, 1961

INVENTOR.
JAMES CAGGAINELLO
By James F. Snowden
Attorney

United States Patent Office 3,166,041
Patented Jan. 19, 1965

3,166,041
RETRACTABLE SIGNAL DEVICES
James Caggainello, Stamford, Conn., assignor to
Cost Reductions, Inc., Stamford, Conn.
Filed June 16, 1961, Ser. No. 117,641
2 Claims. (Cl. 116—114)

This invention relates to a retractable signal assembly adapted to be attached to filler caps of underground tanks and to filler caps so equipped.

Many tanks for the storage of liquids, such as fuel oil for furnaces and boilers used in heating homes and institutions, tanks at airports containing fuel for airplanes, are buried several feet underground in lawns, driveways, etc. Such tanks are equipped with filler pipes having filler cap closures usually flush with grade level or slightly thereabove.

After snow storms, fuel oil suppliers have difficulty in locating these filler caps under the snow. Deliveries are delayed while oil truck drivers endeavor to locate flush filler caps with shovels. Metal locating devices such as mine-detectors have been employed with limited success. Such delays involve not only the wages of the driver but also less use of the expensive truck involved. Moreover, they happen during the season of peak demand for fuel oil and at a time when road conditions and the necessity of shoveling snow to uncover filler caps tend to lower the number of deliveries each truck can make in a day. The problem is particularly acute with new customers whom the supplier is most anxious to please despite having the least information as to the correct location of the filler pipe.

There is a substantial demand for a signal device which will enable an oil truck driver to quickly and surely locate the filler neck of an underground tank after a heavy snowfall. Such a device should not be objectionably conspicuous to the resident. Moreover, it should not interfere with removal of the filler cap with an appropriate tool. It must not present a hazard to children. Finally, it should be out of the way during seasons it is not needed, for instance it should not interfere with maintenance of lawns with lawn mowers and rakes.

An object of the invention is to provide a signal device for locating underground tanks.

Another object of the invention is to provide a simple retractable signal device for locating filler pipes of underground tanks.

A further object of the invention is to provide a foolproof, inexpensive, retractable, signal device easily mounted in the filler caps of underground tanks.

Still another object of the invention is to provide a filler cap having a retractable signal device which is readily seen whereas the filler cap is covered by a deep snow.

Other objects and advantages of the invention will be apparent to those skilled in the art upon consideration of the detailed disclosure hereinbelow.

The present invention accomplishes these objects and solves the problem described above. It is a retractable signal assembly adapted for liquid-tight mounting in an opening in a filler cap that includes a rigid tubular support, such as a hollow bolt, a long resilient rod slidably mounted therein and a packing, sealing the space between the rod and support. Other aspects of the invention include stops to prevent removal of the rod, the upper one of which is also a protective guard to prevent injury to children, and desirably a hue that stands out against a background of snow, a support of sufficient length to properly hold the signal rod, and a resilient packing material as well as the combination of a filler cap with such signal device.

For a better understanding of the nature and objects of this invention, reference should be had to the accompanying drawings in which.

Figure 1:
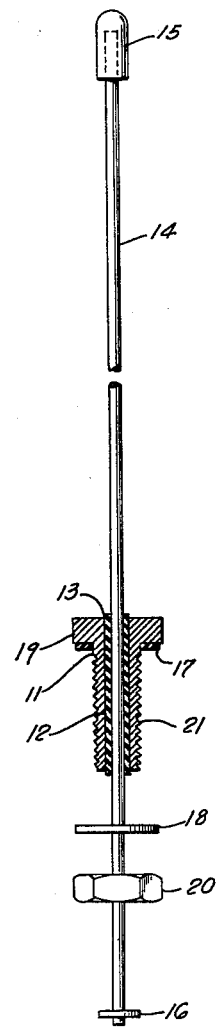
FIG. 1 is an enlarged elevation, partly in section, of a signal device according to the present invention.

Referring to FIG. 1, a tubular support member 11 of annular cross section, preferably in the form of a hollow bolt, with an axial bore 12 extending its full length has an internal sleeve packing 13 affixed in the bore by an adhesive (not shown) or any other suitable means of preventing movement of packing 13 relative to the bore. In the annular sleeve 13 is slidably mounted a signal rod 14 which is equipped with stops 15 and 16 adjacent its upper and lower ends respectively. These stops serve to prevent removal of the rod from the bolt 11 either accidentally or by tampering while the rod is being pushed or pulled through the sleeve 13. They are attached at or near the ends of rod 14 by threads, adhesives, crimping or other suitable means. For liquid-tight mounting of the above-described device in a filler cap, the washers 17 and 18 are provided for respective engagement with the head 19 of bolt 11 and the nut 20 which is adapted to engage the thread 21 of the bolt.

Figure 2:
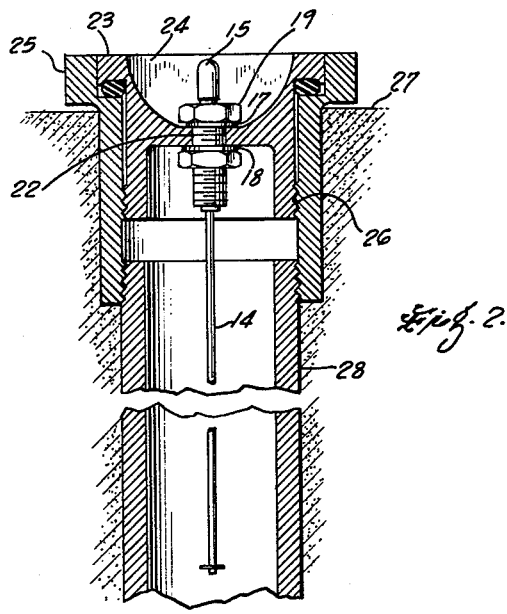
FIG. 2 is a vertical section through the center of a filler cap with the signal means in the retracted position showing the cap attached to the filler pipe of an underground tank.

Turning now to FIG. 2, it will be observed that the signal assembly is mounted in a hole 22 drilled through the center of a filler cap 23 of a type commonly used for domestic underground fuel oil tanks. The cap 23 is provided with a diametrically disposed slot 24 in which a complementary tool (not shown) is employed to secure the cap in a filler neck 25 by threads 26 or equivalent means. If necessary, diametrically opposed flats of bolt head 19 may be ground to fit into slot 24.

The filler neck 25 is located close to the level of the ground 27 and is attached customarily by threads to the filler pipe 28 leading to the underground tank (not shown).

FIG. 2 illustrates the usual position of the signal during the seasons when the filler cap is not likely to be obscured by snow or fallen leaves from trees. The rod 14 is merely pushed down until the tip 15 is in contact with the bolt head 19. With the signal rod in this retracted position inside filler pipe 28, the rod is well protected against damage from lawn mowers and children during their most active seasons of outdoor play. Moreover, the present device is quite inconspicuous and does not detract from the beauty of a well kept lawn.

In this particular installation, wherein the cap removal tool engages the slot 24 in the face of the cap, it may be necessary to alter or redesign the cap removal tool to provide clearance over the tip 15 and bolt head 19, the signal rod 14 being, of course, in the retracted position. However, this is a simple matter as relatively few tools are involved in serving a large number of customers; and it may be readily and simply accomplished by grinding away the portion of the tool designed to engage the center of slot 24. In instances where the cap removal tool engages the circumference of a different style of filler cap, even this minor alteration is unnecessary.

Figure 3:
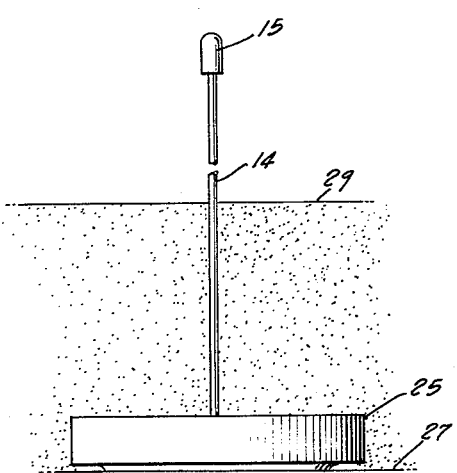
FIG. 3 is an elevation, partly in section, with the signal rod in the extended position above a filler cap covered by a layer of snow.

FIG. 3 depicts the signal rod extended with the filler neck 25 covered by a layer of snow 29. For maximum visibility under such conditions, the tip 15 should be of a color vividly contrasting with snow, such as red, blue, green or black according to desire. It will be appreciated that the novel signal device has equal utility for other conditions that obscure the filler cap such as layers of autumn leaves, unmown lawns, etc.

The bolt or supporting tube 11 should be made of a metal or other rigid and strong material since it supports a rod 14 of considerably greater length. Filler caps usually have a thickness of 1/8" to 3/8" and this is inadequate for supporting the elongated rod 14, hence the tubular support should be considerably longer as is apparent in FIG. 2. The length of the supporting bolt should be at least 6 times and preferably at least 12 times the thickness or diameter of the signal rod. For example, it has been found that a signal rod of 3/32" diameter is well supported in a bolt or tube having a length of 1 1/4 inches or longer. The diameter of the signal rod can be varied according to the demands of the intended service and the length of the rod. It is contemplated that it may range in diameter from 1/16" or less up to 1/4" or more.

The packing 13 should form a liquid-tight seal regardless of the position of the rod 14. A resilient material is preferred for the purpose as this will tend to minimize damage to the signal rod if the latter is struck by a careless foot, shovel, etc. It is also highly desirable to use a material which is resistant to both rain water and the liquid in the underground tank. Among the numerous suitable packing materials are oil-resistant rubbers and elastomers which are also resistant to aging under atmospheric conditions, such as polychloroprene, butadiene-acrylonitrile copolymers, etc. Fabric-forced elastomers of this type, as exemplified by conventional windshield wiper tubing, are particularly preferred for the purpose.

While a single packing sleeve is employed in the simplest construction of the present device, it is feasible to use two packing sleeves or collars since it is only essential to support the rod 14 at the ends of the bore 12. The packing must remain fixed in the bore 12, so the exterior of the packing is usually coated with one of the well-known moisture- and oil-resistant adhesives used for joining elastomers to metals. One of the many suitable adhesives of this type is the combination of a liquid epoxy resin with a flexible hardener such as polysulfide or polyamide resin.

The packing 13 should be of a size such that its interior forms a close fit with the rod 14, while its external diameter should be substantially the same as the internal diameter of the bore 12. A liquid-tight seal with both members is needed but the rod 14 must be able to slide through the packing. It is also desirable to extend the packing slightly beyond the ends of the bore, particularly above the head of the bolt 19, to preclude the accumulation of liquids within the bore.

The length of the signal rod 14 should be adequate to extend above any snow that is likely to fall between deliveries of fuel oil. Thus it may be as short as 12 inches for use in some climates or as long as 36 inches or more in severe climates. A relatively stiff but resilient material is needed and metals are usually preferable for the purpose, although fibrous glass reinforced plastics may be superior in certain applications. While the rod must be flexible, it must also be resilient and resistant to permanent deformation and kinking which will prevent it from sliding through packing sleeve 13. A rod of circular cross-section is preferred as this shape forms the best seal with the packing. To preserve that seal for the longest period, a rod of a corrosion resistant metal such as stainless steel or a phosphor bronze is recommended. If desired, the rod may be painted in a color vividly contrasting with snow in order to enhance its visibility.

The upper stop 15 at the end of the rod is desirably considerably thicker than the rod and of blunt configuration to serve as a protective guard, minimizing the danger to children and animals. It has a number of other functions including preventing the rod from being pushed into or pulled through sleeve 13, increasing the visibility of the rod and serving as a handle for raising and lowering the signal rod. It may be made of metal or of one of the synthetic resins.

The lower stop 16 may be an ordinary nut, snap ring, disc, etc., of metal or any oil-resistant material, such as a synthetic resin, or the lower end of the rod may be either flattened or bent to a suitable angle. To facilitate assembly of the device, the stop is desirably of smaller diameter than bore 12.

Washers 17 and 18 are employed to form liquid-tight seals between the exterior of the bolt 13 and the filler cap 23. They should be of a material sufficiently deformable for that purpose and resistant to both water and the liquid to be stored in the tank; hence oil-resistant elastomers are desirable for use on oil tanks.

The above description of the present invention is intended for the purpose of illustration rather than limitation, and many equivalents will be apparent to those skilled in the art. Accordingly the scope and spirit of the present invention are not restricted to the detailed disclosure hereinabove and should be interpreted only in the light of the appended claims and the prior art.

I claim:

1. A retractable signal device for locating the filler cap of an underground tank comprising in combination,
   (a) a filler cap having a central depression,
   (b) an externally threaded rigid tubular support extending through a threaded opening in the bottom of the depression of the filler cap,
   (c) a resilient signal rod of length greater than maximum expected snow depth in the area where the cap is used, and
   (d) resilient sleeve packing in the support and surrounding the resilient rod to form a liquid type joint, stops adjacent both ends of the rod the upper stop being of blunt configuration and a color contrasting vividly with white, said upper stop having dimensions such that when it strikes the support it does not protrude above the depression in the filler cap.
   (e) the resilient sleeve packing being at least six times the diameter of the rod.

2. A retractable signal device according to claim 1 in which the resilient sleeve packing is at least twelve times the diameter of the resilient rod.

References Cited in the file of this patent

UNITED STATES PATENTS

| | | |
|---|---|---|
| 1,781,534 | Bertschinger | Nov. 11, 1930 |
| 2,324,614 | Dalton | July 20, 1943 |
| 2,467,908 | Rand | Apr. 19, 1949 |
| 2,475,080 | Courcier | July 5, 1949 |
| 2,522,258 | Fanshier | Sept. 12, 1950 |
| 2,592,378 | Chaney et al. | Apr. 8, 1952 |
| 2,656,815 | Downey | Oct. 27, 1953 |
| 2,746,415 | Campbell | May 22, 1956 |
| 2,834,211 | Samaritano | May 13, 1958 |
| 2,939,419 | Hawkins | June 7, 1960 |